(12) United States Patent
Ichijima et al.

(10) Patent No.: US 11,113,591 B2
(45) Date of Patent: Sep. 7, 2021

(54) INFORMATION CONTROL APPARATUS, INFORMATION CONTROL SYSTEM, AND NON-TRANSITORY COMPUTER READABLE MEDIUM

(71) Applicant: FUJIFILM BUSINESS INNOVATION CORP., Tokyo (JP)

(72) Inventors: Shingo Ichijima, Kanagawa (JP); Hideo Kato, Kanagawa (JP); Hisao Komazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 211 days.

(21) Appl. No.: 16/190,789

(22) Filed: Nov. 14, 2018

(65) Prior Publication Data

US 2019/0164027 A1    May 30, 2019

(30) Foreign Application Priority Data

Nov. 27, 2017 (JP) .............................. JP2017-226991

(51) Int. Cl.
*G06K 15/00* (2006.01)
*G06F 3/12* (2006.01)

(52) U.S. Cl.
CPC ........... *G06K 15/403* (2013.01); *G06F 3/121* (2013.01); *G06F 3/1234* (2013.01); *G06K 15/408* (2013.01)

(58) Field of Classification Search
None
See application file for complete search history.

(56) References Cited

U.S. PATENT DOCUMENTS

2006/0145414 A1* 7/2006 Yokobori ............... G03G 15/70
271/258.01
2019/0166270 A1* 5/2019 Ichijima .................. G06F 3/121

FOREIGN PATENT DOCUMENTS

JP    2008-262103 A    10/2008
JP    2012-223973 A    11/2012

OTHER PUBLICATIONS

Jul. 6, 2021 Office Action issued in Japanese Patent Application No. 2017-226991.

* cited by examiner

*Primary Examiner* — Dov Popovici
(74) *Attorney, Agent, or Firm* — Oliff PLC (57) ABSTRACT

An information control apparatus includes a controller. The controller controls a printer including a postprocessing unit that performs postprocessing on sheets of paper printed in units of copies and an accumulation unit that accumulates the sheets of paper that have been subjected to the postprocessing such that the sheets of paper are stacked in units of copies. The controller controls the printer such that in a case where printing is stopped and then resumed in a process of the printing by the printer, an indicator indicating a copy that is being ejected at a time when the printing is stopped is inserted.

10 Claims, 8 Drawing Sheets

INFORMATION CONTROL APPARATUS, INFORMATION CONTROL SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-226991 filed Nov. 27, 2017.

BACKGROUND

Technical Field

The present invention relates to an information control apparatus, an information control system, and a non-transitory computer readable medium.

SUMMARY

According to an aspect of the invention, there is provided an information control apparatus including a controller. The controller controls a printer including a postprocessing unit that performs postprocessing on sheets of paper printed in units of copies and an accumulation unit that accumulates the sheets of paper that have been subjected to the postprocessing such that the sheets of paper are stacked in units of copies. The controller controls the printer such that in a case where printing is stopped and then resumed in a process of the printing by the printer, an indicator indicating a copy that is being ejected at a time when the printing is stopped is inserted.

BRIEF DESCRIPTION OF THE DRAWINGS

Exemplary embodiments of the present invention will be described in detail based on the following figures, wherein.

DETAILED DESCRIPTION

First Exemplary Embodiment

Hereinafter, a first exemplary embodiment of the present invention will be described in detail with reference to drawings.

(Configuration of Printing Control System)

Figure 1:
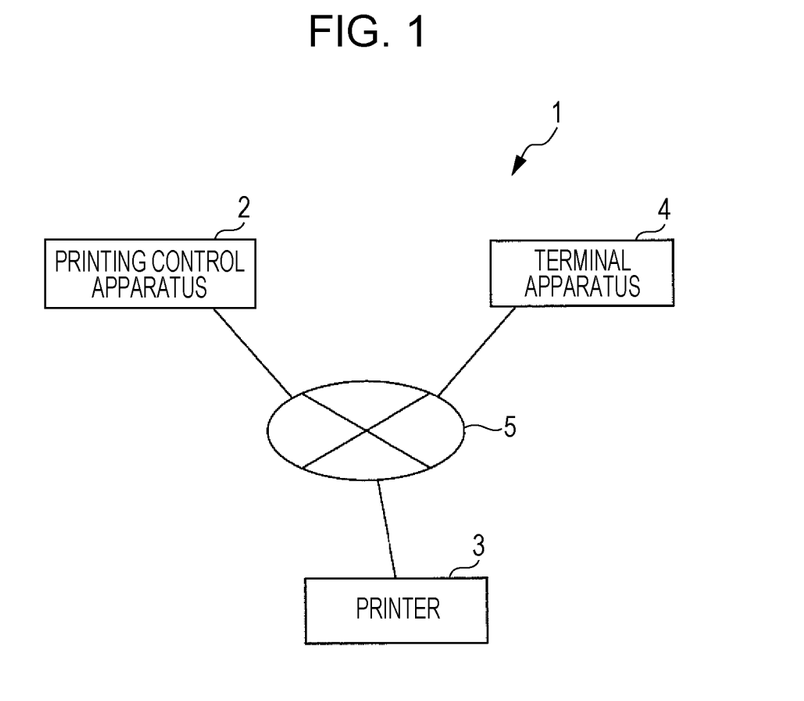
FIG. 1 is a diagram illustrating an example of a schematic configuration of a printing control system according to a first exemplary embodiment of the present invention.

FIG. 1 is a configuration diagram illustrating a schematic configuration of a printing control system according to an exemplary embodiment of the present invention. The printing control system is an example of an information control system.

As illustrated in FIG. 1, a printing control system 1 is configured in which a printing control apparatus 2, a printer 3, and a terminal apparatus 4 are connected to one another via a network 5. In FIG. 1, each of the printer 3 and the terminal apparatus 4 are provided as a single apparatus. However, plural printers 3 and plural terminal apparatuses 4 may be provided.

The printing control apparatus 2 controls execution of printing at the printer 3 in response to a request from the terminal apparatus 4. Furthermore, the printing control apparatus 2 monitors occurrence of a failure that may cause printing to be stopped during printing processing of the printer 3, and controls printing resumption processing of the printer 3 after printing is stopped, in accordance with details of the failure.

The printer 3 performs printing via the printing control apparatus 2 based on a request from the terminal apparatus 4, and outputs a printed material. The printer 3 may include various functions such as scanning and facsimile functions as well as a printing function. The printer 3 may be provided as a single apparatus or plural printers 3 may be provided in association with individual functions.

The terminal apparatus 4 includes a display such as a liquid crystal display (LCD) and an operation unit such as a keyboard and a mouse. A printing instruction is transmitted from the printing control apparatus 2 to the printer 3 in accordance with details of an operation for the operation unit.

The network 5 is a local area network (LAN), the Internet, or the like. The network 5 may be wired or wireless.

(Configuration of Printing Control Apparatus)

Figure 2:
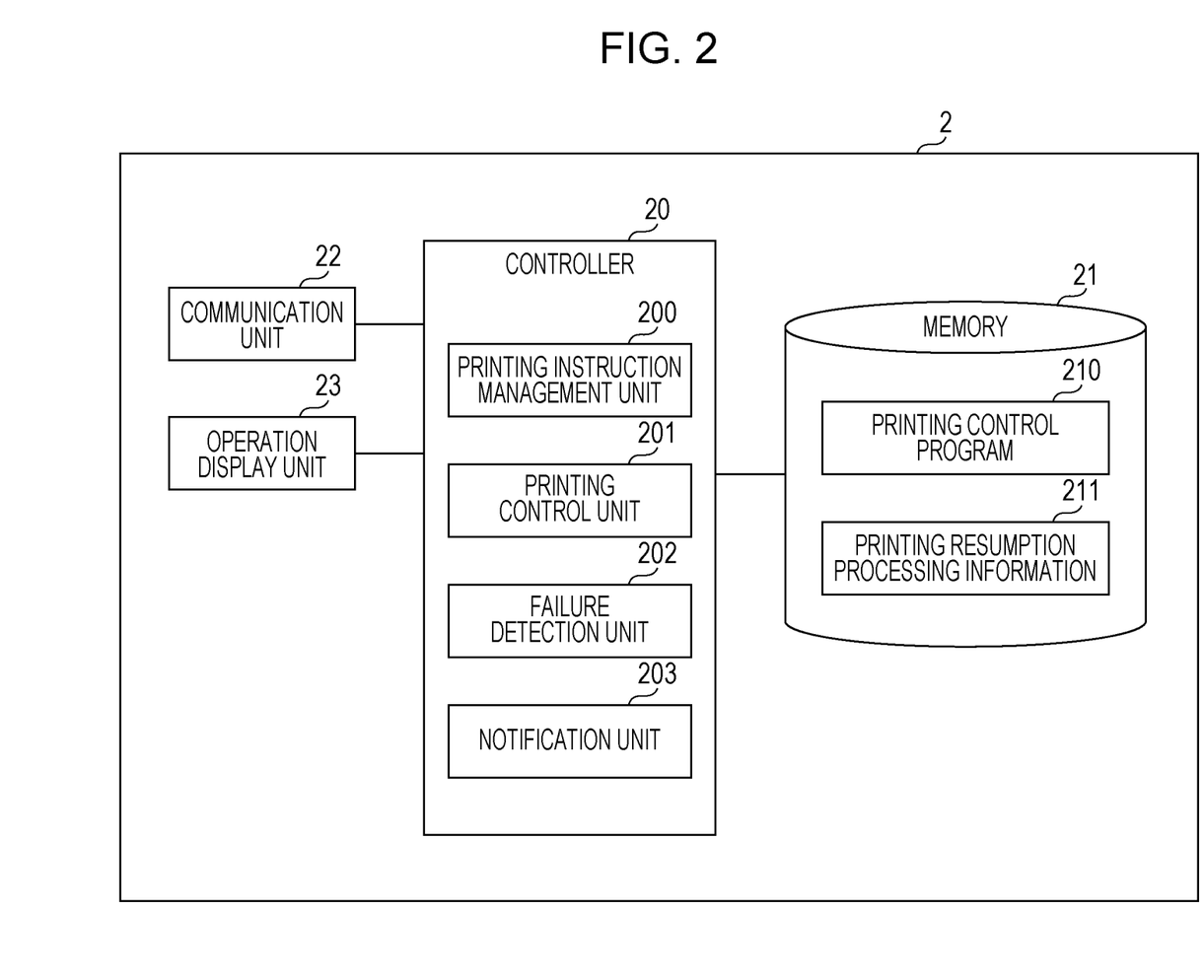
FIG. 2 is a block diagram illustrating an example of a schematic configuration of a printing control apparatus.

FIG. 2 is a block diagram illustrating an example of a configuration of the printing control apparatus 2.

The printing control apparatus 2 includes a controller 20, a memory 21, a communication unit 22, and an operation display unit 23.

The controller 20 includes a central processing unit (CPU), a memory, and the like. The controller 20 controls each unit of the printing control apparatus 2 and executes various programs. The memory 21 includes a storage device such as a hard disk device (HDD), a flash memory, and the like. The memory 21 stores information. The controller 20 and the memory 21 will be described in detail later.

The communication unit 22 communicates with the printer 3 and the terminal apparatus 4 via the network 5. The operation display unit 23 includes a graphical user interface (GUI) that is a so-called user interface and receives input of an instruction from a user while providing information such as an image to the user, a touch panel, and the like. However, the operation display unit 23 is not limited to the above configuration.

The controller 20 functions as a printing instruction management unit 200, a printing control unit 201, a failure detection unit 202, and a notification unit 203 by executing a printing control program 210 stored in the memory 21, which will be described later.

The printing instruction management unit 200 manages a printing instruction transmitted from the terminal apparatus 4 and notifies the printing control unit 201 of the printing instruction. The printing control unit 201 notifies the printer 3 of a printing instruction and controls execution of printing. In particular, the printing control unit 201 performs setting for processing for resumption of printing after printing is stopped, and controls printing resumption processing. The printing resumption processing after printing is stopped will be described in detail later.

The failure detection unit 202 monitors a printing processing operation, based on information transmitted from the printer 3, and detects a printing failure, for example, such as a paper jam. Failures that cause the printer 3 to stop printing are not limited to paper jams. Failures include not only physical causes such shortage of paper and trouble in a postprocessing unit in the case where the printer 3 includes a postprocessing unit but also temporary stoppage by a user. Furthermore, printing failures may occur in various positions in the printer 3. As described in detail later, printing resumption processing is performed in association with a position where a failure occurs.

In the printing resumption processing, the notification unit 203 notifies a user that an indicator indicating a resumption position is added. For example, in the case where a sheet of paper that serves as an indicator indicating a resumption position is inserted for resumption of printing, a user is notified that the sheet of paper has been inserted. With indication of the resumption position, the user is able to confirm a copy that is being ejected at the time when printing is stopped. Such notification is displayed on the operation display unit 23. However, such notification may also be notified to the terminal apparatus 4 and displayed on the terminal apparatus 4.

The memory 21 stores the printing control program 210, printing resumption processing information 211, and the like. The printing control program 210 causes the controller 20 to operate as the printing instruction management unit 200, the printing control unit 201, the failure detection unit 202, and the notification unit 203. The printing resumption processing information 211 is information regarding printing resumption processing set by the printing control unit 201 and includes, for example, information indicating a position at which printed paper is ejected at the time when printing is stopped and a position at which printing will be resumed.

(Configuration of Printer)

Figure 3:
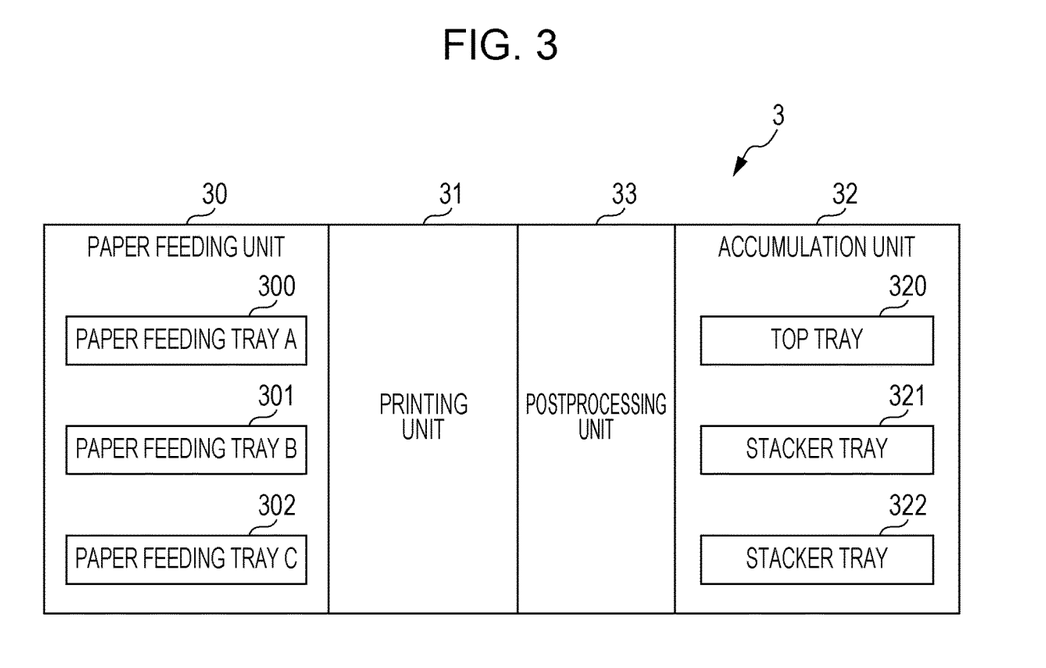
FIG. 3 is a block diagram illustrating an example of a schematic configuration of a printer.

FIG. 3 is a block diagram illustrating an example of a schematic configuration of the printer 3.

The printer 3 includes a paper feeding unit 30, a printing unit 31, an accumulation unit 32, and a postprocessing unit 33. The paper feeding unit 30 includes plural paper feeding trays (a paper feeding tray A 300, a paper feeding tray B 301, and a paper feeding tray C 302). For example, sheets of paper with the same size but different orientations, sheets of paper with different sizes, or the like are stored in the individual paper feeding trays. The paper feeding unit 30 picks up paper from an appropriate one of the paper feeding tray A 300, the paper feeding tray B 301, and the paper feeding tray C 302, and feeds the paper to the printing unit 31. The printing unit 31 performs printing on the paper fed by the paper feeding unit 30 and ejects the paper on which printing has been performed to the accumulation unit 32.

The accumulation unit 32 receives paper ejected from the printing unit 31. The ejected paper is accumulated in the accumulation unit 32 in such a manner that the paper may be easily picked up. The accumulation unit 32 includes plural trays in which paper is accumulated. In FIG. 3, three trays in which paper is accumulated are illustrated. A top tray 320 is arranged at the top. Stacker trays 321 and 322 are arranged below the top tray 320.

The stacker trays 321 and 322 have an offset function of accumulating sheets of paper in such a manner that they are shifted laterally. For example, in the case where printing is performed in units of copies, sheets of paper are accumulated in such a manner that they are shifted laterally for each copy, so that the boundary between copies may be easily identified. In contrast, the top tray 320 does not have the offset function.

Regarding usage of these trays, for example, in the case where one of the stacker trays 321 and 322 is full, a tray to which paper is ejected is switched to the other one of the stacker trays 321 and 322, and in the meantime, printed materials are picked up from the one of the stacker trays 321 and 322 that is full of printed materials. Accordingly, with alternate use of the stacker trays 321 and 322, a large amount of printing may be performed continuously without intermission. Furthermore, the top tray 320 is often used for ejection of sample pages or a small amount of printed materials. In FIG. 3, the paper feeding unit 30 and the accumulation unit 32 each include three trays. However, the number of trays is not limited to this.

In the case where a printing instruction includes postprocessing, the postprocessing unit 33 performs the designated postprocessing in accordance with the printing instruction. Postprocessing may be, for example, stapling processing for stapling plural printed materials together, processing for folding a printed material, or punching processing for punching a hole at an end portion of a printed material, or the like. However, postprocessing is not particularly limited. Furthermore, for some types of postprocessing, postprocessing is not necessarily performed for each copy including plural printed materials. Postprocessing may be performed for individual sheets of printed material composing a copy.

(Operation in First Exemplary Embodiment)

Figure 4:
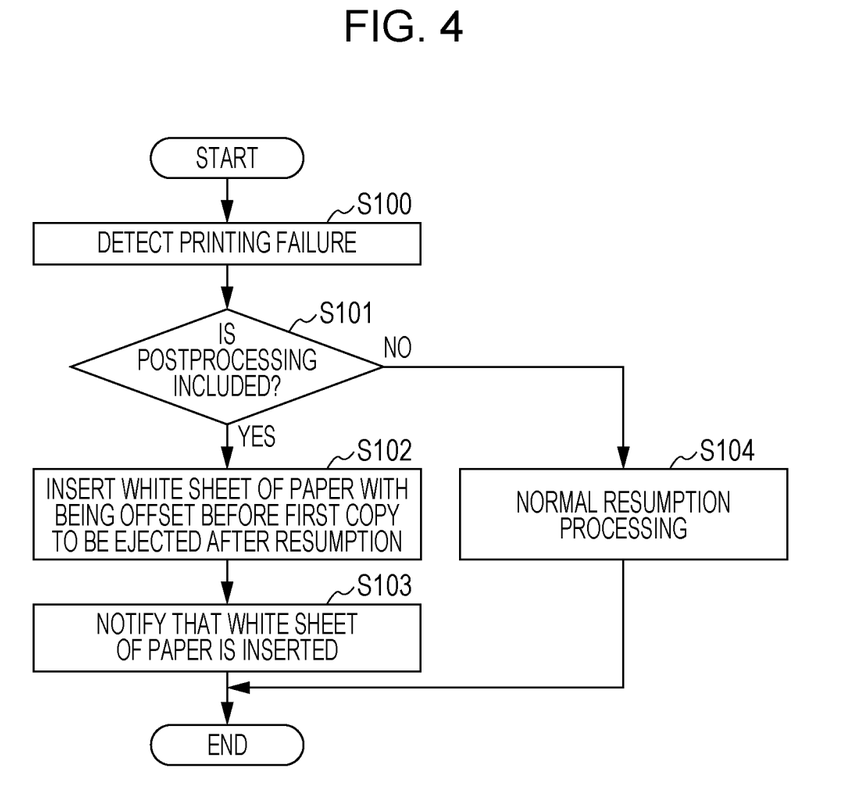
FIG. 4 is a flowchart illustrating an example of an operation of a printing control apparatus according to the first exemplary embodiment.

Next, an operation of the printing control apparatus 2 according to the first exemplary embodiment of the present invention will be described with reference to FIG. 4. FIG. 4 is a flowchart illustrating an example of an operation of the printing control apparatus 2 according to the first exemplary embodiment of the present invention. The failure detection unit 202 of the printing control apparatus 2 periodically receives a state of the printer 3 from the printer 3 and detects occurrence of a printing failure in accordance with the received state (S100).

When occurrence of a failure is detected, the printing control unit 201 of the printing control apparatus 2 stops execution of printing at the printer 3. The printing control unit 201 controls the printer 3 to perform printing resumption processing after the failure is eliminated, in accordance with a position at which the failure has occurred and the details of the failure.

First, the printing control unit 201 determines whether or not a printing instruction that is being executed includes postprocessing (S101). In the case where the printing instruction includes postprocessing (S101; Yes), after printing is resumed, a white sheet of paper is ejected offset before the first copy to be ejected after printing is resumed (S102). In this example, a white sheet of paper is ejected offset, and therefore, a printed material is ejected to an ejection tray (the stacker tray 321 or 322) that includes the offset function of the accumulation unit 32.

Figure 5:
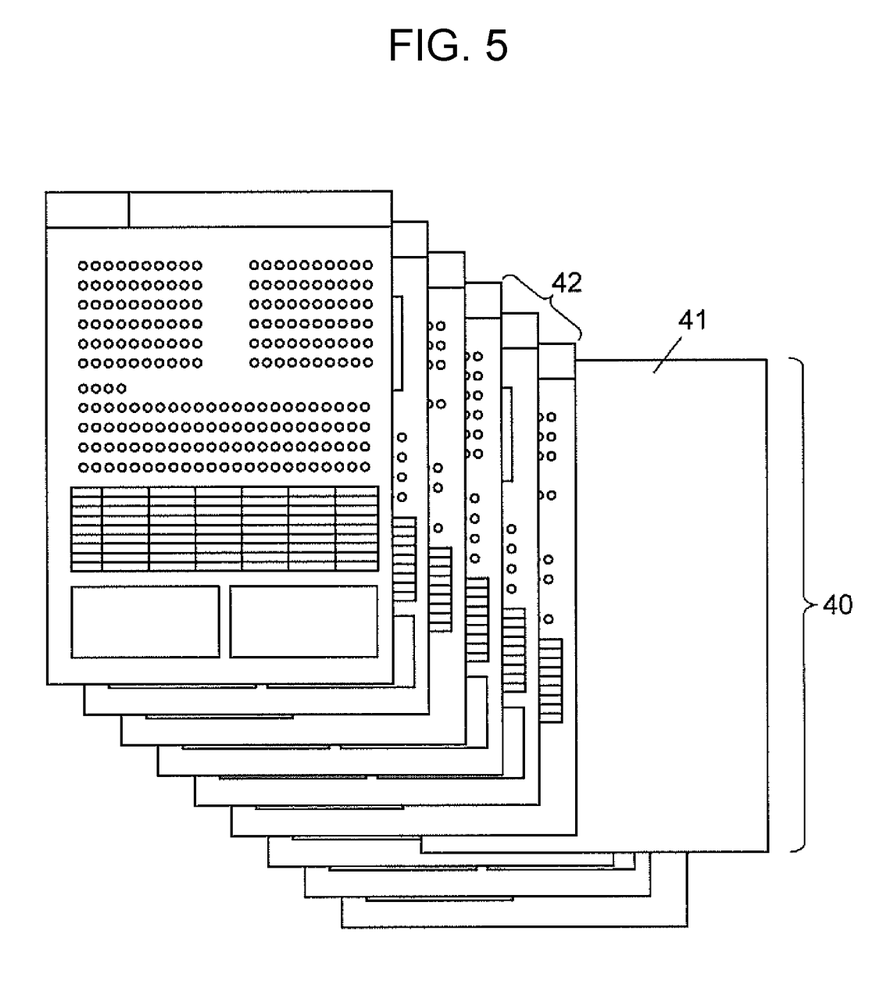
FIG. 5 is a diagram illustrating a state in which a white sheet of paper is inserted in order to indicate a resumption position in the first exemplary embodiment.

FIG. 5 illustrates a state in which, in order to indicate a resumption position, a white sheet of paper is inserted before the first copy to be ejected after printing is resumed.

In the example of FIG. 5, for example, a case where a failure occurs when a first copy 40 is ejected while processing for binding three sheets of printed material together is being performed as postprocessing is illustrated (in FIG. 5, for easier understanding of the number of sheets of printed material, individual copies are not bound together). As illustrated in FIG. 5, after printing is resumed, before ejection of a second copy 42, a white sheet of paper 41 is ejected offset as an indicator indicating a resumption position.

Each copy is composed of three sheets of paper, and three sheets of paper are bound together. For example, during ejection of the first copy 40, after the second sheet of paper is ejected, a failure occurs, and printing is stopped. In the case where the failure is a paper jam at the paper feeding unit 30 or the printing unit 31, the failure does not affect the postprocessing unit 33. Therefore, after printing is resumed and the third sheet of paper of the first copy 40 is ejected, the first copy 40 including all the three sheets of paper that are bound together is ejected, and before ejection of the second copy 42, the white sheet of paper 41 that indicates a resumption position is ejected offset.

In the case where setting for ejecting individual copies with being offset is performed, if a failure occurs and printing is stopped at the time when the two sheets of paper of the first copy 40 are ejected, after printing is resumed and the two sheets of paper are bound together and ejected, the third sheet of paper of the first copy 40 is ejected independently (if each copy is composed of a large number of sheets of paper and there are plural remaining sheets of paper of the first copy 40 that are to be ejected after resumption, the remaining sheets of paper are bound together and ejected), and the white sheet of paper 41 is ejected offset before the next second copy 42 is ejected.

In the case where a failure occurs in the postprocessing unit 33 and printing is stopped, after printing is resumed, the first copy 40 is ejected without postprocessing being performed, and the white sheet of paper 41 is ejected offset before the next second copy 42 is subjected to postprocessing and is ejected.

In any of the above-mentioned cases, the white sheet of paper 41 that indicates a resumption position is ejected offset before the second copy 42 is subjected to normal postprocessing and is ejected. Therefore, the inserted white sheet of paper 41 serves as an indicator indicating a position at which a failure occurs, that is, a copy that is being ejected at the time when printing is stopped. Accordingly, a user is able to confirm a resumption position and understand a copy in which a failure has occurred. Therefore, processing for printing the copy again if necessary or the like may be performed in accordance with a state of ejection of the copy.

In the example illustrated in FIG. 5, the white sheet of paper 41 that indicates a resumption position is ejected offset. However, in the case where a printed material is ejected to an ejection tray that does not have the offset function (in this case, the top tray 320) or in the case where the offset function is not used even though the offset function is provided, a white sheet of paper whose orientation is different from a transport direction may be ejected as an indicator indicating a resumption position. Furthermore, a white sheet of paper with a size different from the size of paper that has been used for printing or a specific sheet of paper with a size specified in advance may be ejected as an indicator. That is, any type of paper may be used as paper for an indicator as long as at least part of the paper sticks out from sheets of paper that have been accumulated in an ejection tray. Accordingly, by inserting a sheet of paper that serves as an indicator, a user is able to confirm a resumption position as a boundary between copies in the case where ejection is performed in units of copies in accordance with a printing instruction including postprocessing, while impact on the postprocessing being reduced.

As described above, in the case where, after printing is resumed, in order to indicate a resumption position, a white sheet of paper that serves as an indicator is inserted before the next copy is ejected, the notification unit 203 notifies that the white sheet of paper is inserted as an indicator before the next copy is ejected (S103). This notification is displayed on the operation display unit 23.

Figure 6:
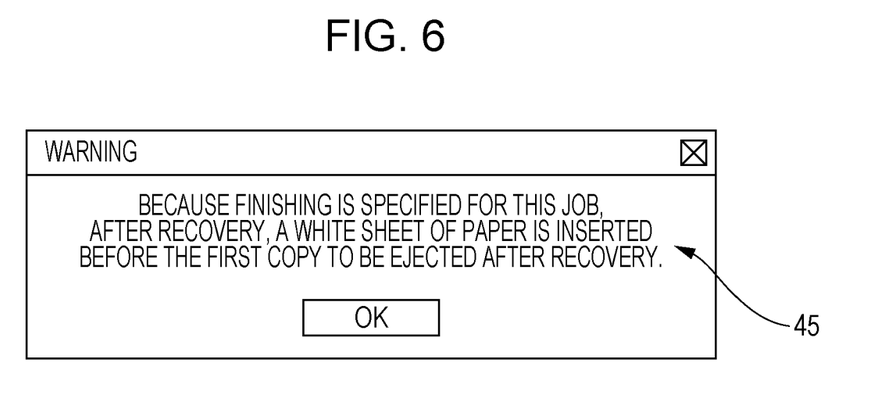
FIG. 6 is diagram illustrating an example of a message displayed when a sheet of paper indicating a resumption position is inserted.

For example, as illustrated in FIG. 6, as a message 45 "Because finishing is specified for this job, after recovery, a white sheet of paper is inserted before the first copy to be ejected after recovery.", a notification indicating that a sheet of paper indicating a resumption position is inserted is displayed on the operation display unit 23.

In contrast, in the case where the printing instruction does not include postprocessing (S101; No), after printing is resumed, normal resumption processing is performed (S104). That is, in the case where an ejection tray has an offset function, the first thing to do after resumption is to eject a white sheet of paper with being offset. Furthermore, in the case where an ejection tray does not have the offset function or the offset function is not used even though the offset function is provided, a white sheet of paper whose orientation is different from the transport direction, a white sheet of paper with a different size, or a white sheet of paper with a size specified in advance is ejected so that a resumption position may be indicated.

Second Exemplary Embodiment

Next, a second exemplary embodiment of the present invention will be described. An apparatus configuration of the second exemplary embodiment is similar to that of the first exemplary embodiment. An operation in the second exemplary embodiment will be described below.

(Operation in Second Exemplary Embodiment)

Figure 7:
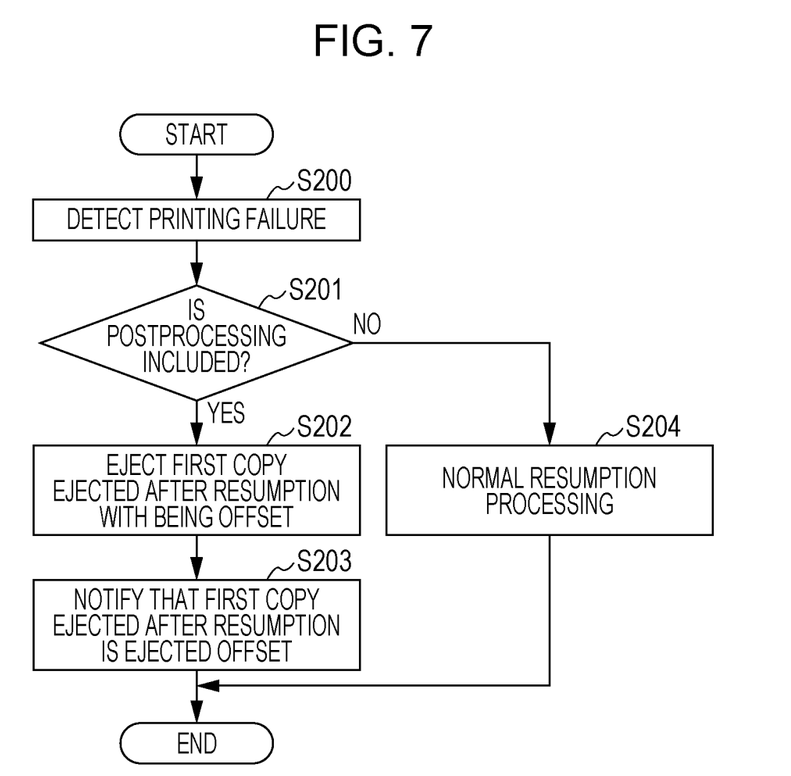
FIG. 7 is a flowchart illustrating an example of an operation of a printing control apparatus according to a second exemplary embodiment of the present invention.

An operation of the printing control apparatus 2 according to the second exemplary embodiment of the present invention will be described with reference to FIG. 7. FIG. 7 is a flowchart illustrating an example of an operation of the printing control apparatus 2 according to the second exemplary embodiment of the present invention.

The failure detection unit 202 of the printing control apparatus 2 periodically receives a state of the printer 3 from the printer 3 and detects occurrence of a printing failure in accordance with the received state (S200). When occurrence of a failure is detected, the printing control unit 201 of the printing control apparatus 2 stops execution of printing at the printer 3. The printing control unit 201 controls the printer 3 to perform printing resumption processing after the failure is eliminated, in accordance with a position at which the failure has occurred and the details of the failure.

First, the printing control unit 201 determines whether or not a printing instruction that is being executed includes postprocessing (S201). In the case where the printing instruction includes postprocessing (S201; Yes), after printing is resumed, the first copy that is subjected to postprocessing and is ejected after printing is resumed is ejected offset (S202). In this example, a printed material is ejected to an ejection tray (the stacker tray 321 or 322) that includes the offset function of the accumulation unit 32.

Figure 8:
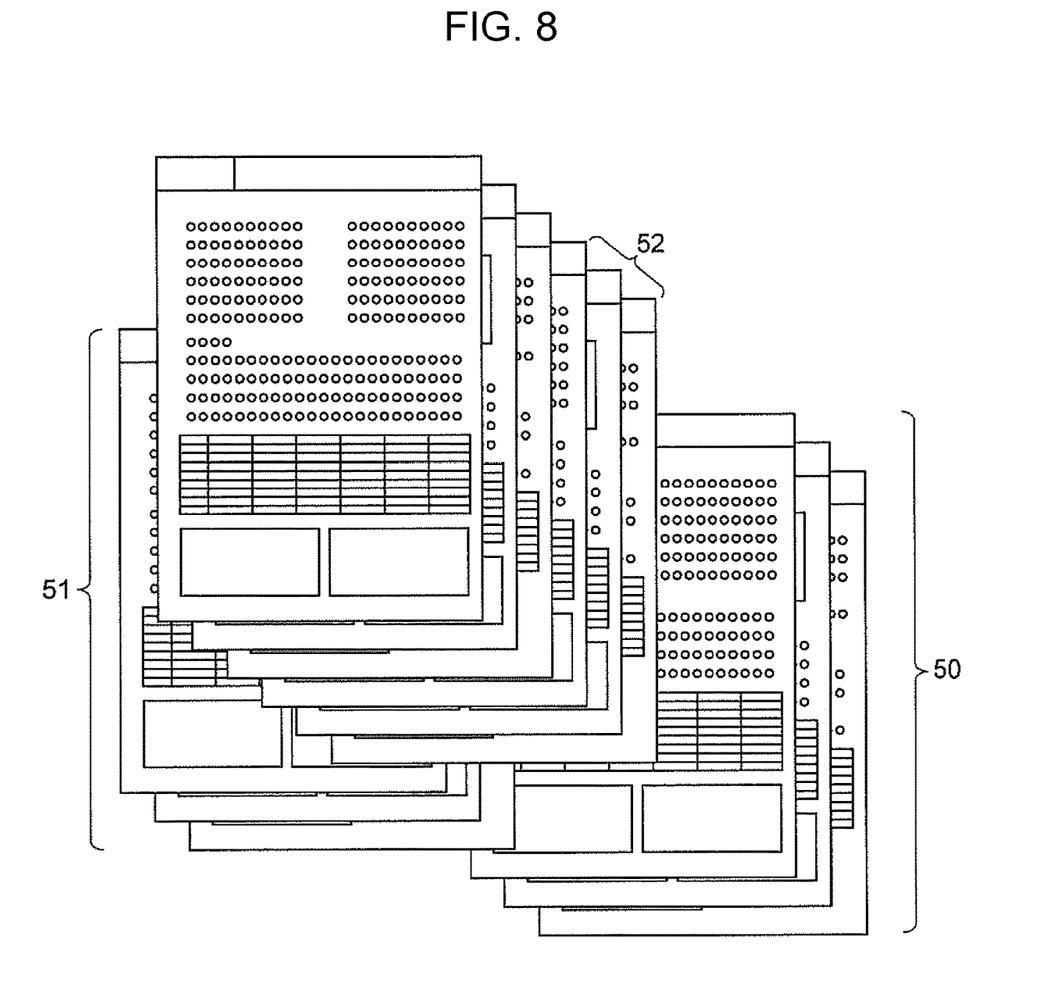
FIG. 8 is a diagram illustrating a state in which the next copy is ejected offset in order to indicate a resumption position in the second exemplary embodiment.

FIG. 8 illustrates a state in which, in order to indicate a resumption position, the first copy ejected after printing is resumed is ejected offset.

In the example of FIG. 8, for example, a case where a failure occurs when a first copy 50 is ejected while processing for binding three sheets of printed material together is being performed as postprocessing is illustrated (in FIG. 8, for easier understanding of the number of sheets of printed material, individual copies are not bound together). As illustrated in FIG. 8, after printing is resumed, a second copy 51 that has been subjected to postprocessing is ejected offset as an indicator indicating a resumption position.

Each copy is composed of three sheets of paper, and three sheets of paper are bound together. For example, during ejection of the first copy 50, after the second sheet of paper is ejected, a failure occurs, and printing is stopped. For the first copy 50 that is being ejected, resumption processing corresponding to a position at which the failure has occurred is performed, as in the first exemplary embodiment described above.

In the second exemplary embodiment, when a failure occurs in the first copy 50 and printing is stopped, the second copy 51, which is the first copy that is ejected after printing is resumed, is ejected offset as an indicator of a resumption position. After that, the third copy 52 and later copies are ejected normally. Accordingly, a user is able to understand the resumption position. Therefore, after printing is performed, the first copy 50 in which the failure occurred may be checked, and printing may be performed again if necessary.

As described above, in the case where, after printing is resumed, the first copy ejected after printing is resumed is ejected offset in order to indicate a resumption position, the notification unit 203 notifies that the first copy ejected after printing is resumed is ejected offset (S203). This notification is displayed on the operation display unit 23.

Figure 9:
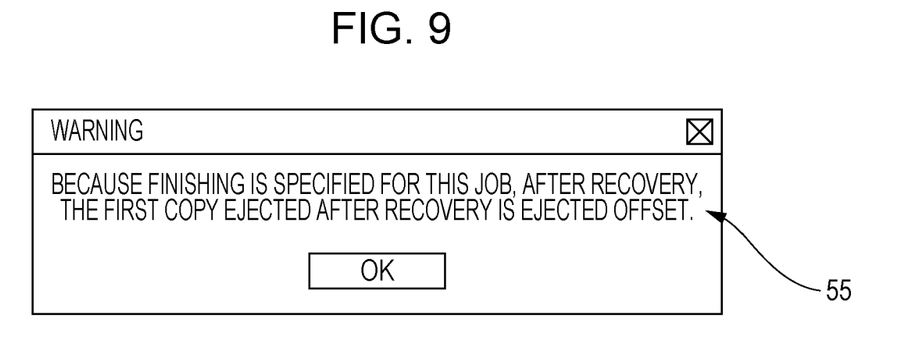
FIG. 9 is a diagram illustrating an example of a message displayed when the next copy is ejected offset in order to indicate a resumption position.

For example, as illustrated in FIG. 9, as a message 55 "Because finishing is specified for this job, after recovery, the first copy ejected after recovery is ejected offset.", a notification indicating that the next copy is ejected offset in order to indicate a resumption position is displayed on the operation display unit 23.

In contrast, in the case where the printing instruction does not include postprocessing (S201; No), after printing is resumed, normal resumption processing is performed (S204). In this case, postprocessing is not performed. Therefore, resumption processing specified in advance is performed. For example, the first sheet of paper printed after resumption is ejected offset. Alternatively, depending on the setting, a white sheet of paper is ejected offset, the first sheet of paper printed after resumption or a white sheet of paper is ejected in an orientation different from the transport direction, or a white sheet of paper with a larger size is ejected, so that a user is able to confirm a resumption position.

As described above, by causing a copy that is ejected after printing is resumed to be ejected offset as in the second exemplary embodiment, in execution of a printing instruction for performing postprocessing and ejecting printed materials in units of copies, a user is able to confirm a resumption position in a case where a failure has occurred.

As an indicator of a resumption position, instead of ejecting the next copy that is first ejected after printing is resumed with being offset, the next copy that is first ejected after printing is resumed may be ejected in an orientation different from a transport direction. As described above, "inserting an indicator" represents not only literally "inserting" a sheet of paper as an indicator as in the first exemplary embodiment but also ejecting the next copy with being offset or in an orientation different from the transport direction. That is, in the execution of a printing instruction including postprocessing in units of copies, an indicator that allows a user to confirm the boundary between copies indicating a resumption position after printing is stopped may be provided such that the indicator does not affect the postprocessing in units of copies.

In each of the exemplary embodiments described above, details of printing resumption processing in the case where a failure has occurred are set in advance in the printing control apparatus 2, and the printing resumption processing is performed in accordance with the setting. The setting for the printing resumption processing is performed in advance by, for example, an operator or the like of the printing control system 1, and the setting may be changed in an appropriate manner by the operator or the like.

Next, setting for printing resumption processing will be described. The setting may be performed using the operation display unit 23 of the printing control apparatus 2.

Figure 10:
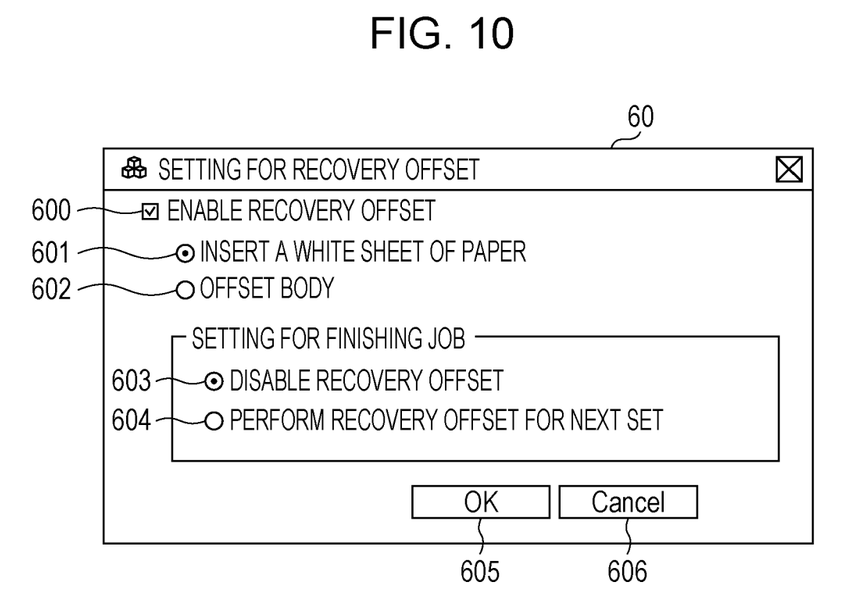
FIG. 10 is a diagram illustrating an example of a GUI screen for performing setting for printing resumption processing.

FIG. 10 illustrates an example of a GUI screen displayed on the operation display unit 23.

For processing (recovery offset) for providing an indicator indicating a resumption position in printing resumption processing on a GUI screen 60 illustrated in FIG. 10, first, a checkbox 600 for "Enable recovery offset" is ticked.

Then, setting for what is to be used as an indicator indicating a resumption position is performed. In the case where a white sheet of paper is ejected offset as in the first exemplary embodiment as described above, a radio button 601 for "Insert a white sheet of paper" is selected. In the case where the next copy is ejected offset as in the second exemplary embodiment, a radio button 602 for "Offset the body" is selected.

Furthermore, in the case where a printing instruction including postprocessing is executed as setting for postprocessing (finishing job), setting may be performed such that processing for providing an indicator indicating a resumption position is not performed in printing resumption processing. In this case, a radio button 603 for "Disable recovery offset" is selected.

Furthermore, to eject the first copy to be ejected after printing is resumed with being offset, a radio button 604 for "Perform recovery offset for the next set" is selected.

Lastly, when an "OK" button 605 is clicked, the above input settings are confirmed. To cancel the above settings, by clicking a "cancel" button 606, all the above input settings are deleted.

Various exemplary embodiments of the present invention have been described above. However, the present invention is not limited to the exemplary embodiments described above. Various changes may be made to the present invention without departing from the scope of the present invention. For example, a function of the printing control apparatus 2 may be provided as a controller in the printer 3. Furthermore, for example, the printing control program 210 according to the foregoing exemplary embodiment may be stored in a recording medium such as a compact disc-read only memory (CD-ROM) and provided.

Furthermore, a program used in the foregoing exemplary embodiment may be stored in an external server such as a cloud server and used via a network.

Furthermore, part of or the entire units of the controller 20 may be each formed as a hardware circuit such as a field programmable gate array (FPGA), an application specific integrated circuit (ASIC), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information control apparatus comprising:
a controller that controls a printer including a postprocessing unit that performs postprocessing on sheets of paper printed in units of copies and an accumulation unit comprising a plurality of trays, the accumulation unit accumulating the sheets of paper that have been subjected to the postprocessing such that the sheets of paper are stacked in units of copies,
wherein the controller controls the printer such that in a case where printing is stopped and then resumed in a process of the printing by the printer, an indicator indicating a copy that is being ejected at a time when the printing is stopped is inserted, and
wherein the controller performs control such that as the indicator, a copy that is first ejected after the printing is resumed is ejected offset or ejected in an orientation different from a transport direction of a sheet of paper that has been used until the printing is stopped.

2. The information control apparatus according to claim 1, wherein the controller performs control such that a sheet of paper that sticks out from other sheets of paper when being accumulated in the accumulation unit is inserted before the first copy after the printing is resumed as the indicator.

3. The information control apparatus according to claim 2, wherein the sheet of paper that sticks out from other sheets of paper and that is inserted in order to indicate a resumption position is a sheet of paper that is ejected offset, the sheet of paper having a same size as a sheet of paper that has been used until the printing is stopped, or a sheet of paper whose orientation is different from a transport direction of the sheet of paper that has been used until the printing is stopped.

4. The information control apparatus according to claim 2, wherein the sheet of paper that sticks out from other sheets of paper and that is inserted in order to indicate a resumption position has a size different from a size of a sheet of paper that has been used until the printing is stopped.

5. The information control apparatus according to claim 1, wherein in a case where as the indicator, the copy that is first ejected after the printing is resumed is ejected offset or ejected in the orientation different from the transport direction of the sheet of paper that has been used until the printing is stopped, the controller notifies that the copy that is first ejected after the printing is resumed is ejected offset or ejected in the orientation different from the transport direction of the sheet of paper that has been used until the printing is stopped.

6. The information control apparatus according to claim 1, wherein the postprocessing is performed in units of copies, and the controller performs control such that the indicator indicating the copy that is being ejected at the time when the printing is stopped is inserted.

7. The information control apparatus according to claim 6, wherein the controller performs control such that a sheet of paper that has a same size as the sheet of paper that has been used until the printing is stopped and whose orientation is different from a transport direction of the sheet of paper that has been used until the printing is stopped or a sheet of paper that has a size different from a size of the sheet of paper that has been used until the printing is stopped is inserted, as the indicator, before a copy that is first subjected to the postprocessing in units of copies after the printing is resumed.

8. The information control apparatus according to claim 7, wherein the controller performs control such that, as the indicator, the copy that is first subjected to the postprocessing in units of copies after the printing is resumed is ejected offset or ejected in an orientation different from a transport direction of the sheet of paper that has been used until the printing is stopped.

9. An information control system comprising:
a printer that includes a postprocessing unit that performs postprocessing on sheets of paper printed in units of copies and an accumulation unit comprising a plurality of trays, the accumulation unit accumulating the sheets of paper that have been subjected to the postprocessing such that the sheets of paper are stacked in units of copies; and
an information control apparatus that includes a controller that controls the printer such that in a case where printing is stopped and then resumed in a process of the printing by the printer, an indicator indicating a copy that is being ejected at a time when the printing is stopped is inserted, the controller further performing such that as the indicator, a copy that is first ejected after the printing is resumed is ejected offset or ejected in an orientation different from a transport direction of a sheet of paper that has been used until the printing is stopped.

10. A non-transitory computer readable medium storing a program causing a computer to execute a process for information control, the process comprising:
controlling a printer including a postprocessing unit that performs postprocessing on sheets of paper printed in units of copies and an accumulation unit comprising a plurality of trays, the accumulation unit accumulating the sheets of paper that have been subjected to the postprocessing such that the sheets of paper are stacked in units of copies,
wherein the printer is controlled such that in a case where printing is stopped and then resumed in a process of the printing by the printer, an indicator indicating a copy that is being ejected at a time when the printing is stopped is inserted, and
wherein the printer is controlled such that as the indicator, a copy that is first ejected after the printing is resumed is ejected offset or ejected in an orientation different from a transport direction of a sheet of paper that has been used until the printing is stopped.

* * * * *